Patented Feb. 3, 1925.

1,524,676

UNITED STATES PATENT OFFICE.

EDWARD R. STOWELL, OF PORTLAND, INDIANA, ASSIGNOR OF ONE-HALF TO CHARLES M. MAYO, OF INDIANAPOLIS, INDIANA.

FIREPROOFING AND INSULATING COMPOSITION AND PROCESS OF MAKING THE SAME.

No Drawing. Application filed October 23, 1922. Serial No. 596,508.

*To all whom it may concern:*

Be it known that I, EDWARD R. STOWELL, a citizen of the United States, and a resident of Portland, county of Jay, and State of Indiana, have invented a certain new and useful Fireproofing and Insulating Composition and Process of Making the Same; and I do hereby declare that the following is a full, clear, and exact description thereof.

This invention relates to a plastic composition for fire proofing and insulating purposes and the process of making the same.

The composition may be used in the manufacture of brick, hollow tile, cast slabs and insulating filler in granular form, as ordinarily made from gypsum, magnesia, asbestos and the like. It may also be used for insulating purposes and to that end may be moulded in a concrete-like form for building refrigerating or cooling boxes.

One of the main objects of the invention is to prepare a plastic composition which is light, cheap, fire proof, weather proof and of considerable strength for general temperature insulating purposes.

The composition and the process of making the same will be more fully set forth and appear from the following description and claims.

The composition or product is made from sawdust, shavings or finely divided wood particles combined with ground kieselguhr and saturated with sodium silicate to a paste or mortar. The above may then be dried to a semi-granular form to be rammed or packed in the cavity to be insulated. If it is desired to mould the product, or apply it by trowelling Portland cement may then be added and the resulting plastic composition placed in forms or moulds to give it the desired shape, or may be applied to a surface with a trowel.

The composition or product may be formed by mixing the various ingredients in the following proportions:

Sodium silicate (40 degrees Baumé) _____ 1 part.
Water _____ 2 parts.
Sawdust (or finely divided wood particles) _____ 4 parts.
Kieselguhr _____ 1 part.

All parts of the above formula are by volume, and constitute the average mixture, although the same may be varied to suit the purpose for which it is used. After the wood particles have been incorporated with the above solution they should be given time to absorb the liquid and become saturated with the same.

A considerable quantity of the saturated plastic as above set forth, may be prepared in advance. However, the cement should be added only to that which is to be placed in moulds or used at once, as it will set very rapidly and become hard and unworkable. The time in which the composition will set can be gauged by the amount of cement used, the more cement the quicker the set and the stronger the resulting product. One part of Portland cement with six or seven parts of the saturated plastic is the average proportion. When used as a plaster or stucco about twenty-five per cent of the saturated plastic should be cement. The cement content may vary from ten to thirty per cent. When a product of greater strength is desired, one part of small stone aggregate such as slate or marble dust or fine sand may be added to three parts of the saturated plastic before the cement is added. The products of this composition may be air cured the same as Portland cement products and may also be quick cured by subjecting the same to a temperature of 300 to 400 degrees Fahrenheit in a kiln or oven just as soon as the same has strength enough to be removed from the moulds. Of course, when used in granular form for insulating by packing no cement need be added.

The invention claimed is:

1. A fire proofing and insulating composition comprising a mixture of substantially four parts finely divided wood particles, one part of kieselguhr, one part sodium silicate, and two parts of water.

2. A plastic fire proofing and insulating composition comprising a mixture of substantially four parts finely divided wood particles, one part of kieselguhr, one part sodium silicate, two parts of water, and mixing the same with ten to thirty per cent of cement.

3. A plastic fire proofing and insulating composition comprising a mixture of substantially four parts finely divided wood particles, one part of kieselguhr, one part sodium silicate, two parts of water, two and one half parts of small stone aggregate such as slate, marble dust or fine sand for strengthening purposes, and mixing the same with ten to thirty per cent of cement.

In witness whereof, I have hereunto affixed my signature.

EDWARD R. STOWELL.